United States Patent
Fleming et al.

(10) Patent No.: US 8,660,605 B2
(45) Date of Patent: Feb. 25, 2014

(54) MOBILE COMMUNICATIONS DEVICE INTERFACE DEVICE AND METHOD

(75) Inventors: Jeremiah J. Fleming, Wildwood, MO (US); Jimmin Yao, Fremont, CA (US); Shirley T. Sun, Saratoga, CA (US); Nathaniel P. Levonius, San Jose, CA (US)

(73) Assignee: Altigen Communications, Inc., San Jose, CA (US)

( * ) Notice: Subject to any disclaimer, the term of this patent is extended or adjusted under 35 U.S.C. 154(b) by 443 days.

(21) Appl. No.: 12/963,886

(22) Filed: Dec. 9, 2010

(65) Prior Publication Data

US 2011/0300900 A1   Dec. 8, 2011

Related U.S. Application Data

(60) Provisional application No. 61/324,029, filed on Apr. 14, 2010, provisional application No. 61/285,490, filed on Dec. 10, 2009.

(51) Int. Cl.
 *H04M 1/00* (2006.01)
(52) U.S. Cl.
 USPC ........... 455/555; 455/450; 455/458; 455/434; 455/466; 455/404.1; 455/552.1
(58) Field of Classification Search
 USPC ............. 455/426.1, 414.1, 555, 556.1, 404.1, 455/417; 370/389, 252, 328, 352, 338
 See application file for complete search history.

(56) References Cited

U.S. PATENT DOCUMENTS

| | | | |
|---|---|---|---|
| 5,333,176 A | 7/1994 | Burke et al. | |
| 6,240,426 B1 | 5/2001 | Beyda et al. | |
| 6,301,339 B1 | 10/2001 | Staples et al. | |
| 2003/0045283 A1* | 3/2003 | Hagedoorn | 455/426 |
| 2003/0078071 A1 | 4/2003 | Uchiyama | |
| 2004/0072544 A1 | 4/2004 | Alexis | |
| 2005/0208986 A1* | 9/2005 | Best et al. | 455/575.7 |
| 2005/0286466 A1 | 12/2005 | Tagg et al. | |
| 2011/0130168 A1* | 6/2011 | Vendrow et al. | 455/556.1 |

OTHER PUBLICATIONS

International Preliminary Report on Patentability for PCT Application No. PCT/US2010/059818, mailed on Jun. 21, 2012, 10 pages.
International Search Report and Written Opinion corresponding to the PCT application No. PCT/US2010/059818, date of mailing Feb. 9, 2011, 14 pages total.

* cited by examiner

*Primary Examiner* — Joseph Arevalo
(74) *Attorney, Agent, or Firm* — Kilpatrick Townsend & Stockton LLP; Kenneth R. Allen

(57) ABSTRACT

A telephone includes a full-sized telephone handset, a telephone base unit including a plurality buttons including numeric buttons and function buttons, a display for displaying status data to a user, a physical interface for irremovably restrain a cellular telephone, a Bluetooth interface for transmitting control data and digital audio data to and from the cellular telephone, a processor for receiving user inputs and communicating the inputs to the cellular telephone, and an audio processor for processing audio data prior to output to and for processing audio data input from the telephone handset.

17 Claims, 4 Drawing Sheets

MOBILE COMMUNICATIONS DEVICE INTERFACE DEVICE AND METHOD

CROSS-REFERENCES TO RELATED APPLICATIONS

The present patent application claims benefit under 35 USC 119(e) to priority to provisional application Nos. 61/285,490 filed Dec. 10, 2010 and 61/324,029 filed Apr. 10, 2010. These disclosures are herein by incorporated by reference, for all purposes.

BACKGROUND OF THE INVENTION

This invention relates to mobile telephone devices and more particularly to accessories for enhancing a mobile telephone handset.

The inventors of the present invention have recognized the fact that many people now have at least two or more telephone numbers: one number for a portable cell phone; one number for a home telephone; and one number for a business telephone. With businesses, many users still have an office phone and a business telephone. However, some users are beginning to dispense with having a telephone number at home. Such users thus use their cell phone as their primary point of contact.

Problems with businesses maintaining two numbers per user, considered by the inventors, include the redundant expense of paying for a dedicated business landline infrastructure and cell phone service. Another problem includes that cell phones are not easily integrated into the business PBX infrastructure. Although, business PBXs can call-out to cell phones, cell phones do not typically have the control of a business PBX to the same extent as desktop telephones.

Problems with using a cell phone as a primary home number, considered by the inventors, include that users sacrifice the convenience of having a home phone infrastructure, such as a base station, two or more home telephone handsets, handset locator, and the like. Another typical problem is misplacement of the cell phone while at the user's home.

In light of the above, what is desired are methods and apparatus for interfacing a portable cell phone with a stationary telephone device without the drawbacks described above.

SUMMARY OF THE INVENTION

According to the invention, a multi-function device in a console is provided upon which a portable cellular telephone device can be mounted and through which the cellular telephone device may communicate as a mobile extension of a PBX, among other functions. The multi-function device allows the speech path to be redirected from the cellular telephone device over a wireless media (Bluetooth, IR, or the like) to a full-sized handset or wide-band speaker, or the like on the multi-function device. In other embodiments both a data path and speech path from the cellular telephone may be wired. Additional functionality may include a physical dock upon which to mount the portable telephone device and an electrical interface for interfacing the portable telephone device to a computer.

In various embodiments, the cellular telephone device/base unit may be directed to call a telephone number associated with a PBX via the user pressing a dedicated hardware/software key. Subsequently the cellular telephone device/base unit embodiments may make a call to a PBX pilot number. In various embodiments, once connected, the cellular telephone device/base unit may provide one or more DTMF telephones to log into the PBX.

According to one aspect of the invention, a desktop telephone device is described. One apparatus may include a full-sized telephone handset coupled to the telephone base unit, wherein the full-sized telephone handset comprising a microphone and a speaker, wherein the microphone is configured to receive audio data from the user and wherein the speaker comprises a wide-band speaker configured to output audio data to the user. A system may include a telephone base unit including a plurality buttons including numeric buttons and function buttons, wherein the plurality of buttons are configured to receive selections by a user, a display, wherein the display is configured to display status data to a user, and a physical interface, wherein the physical interface is configured to irremovably restrain a portable PBX communication and display unit with respect to the telephone base unit. A telephone base unit may include a wireless communication unit configured to wirelessly transmit control data and digital audio data to and from the portable PBX communication and display unit, and a processor coupled to the plurality of buttons, the display and to the wireless communication unit, wherein the processor is coupled to receive the selections by the user of buttons from the plurality of buttons, wherein the processor is configured to initiate communication between the wireless communication unit and the portable PBX communication and display unit in response to at least one of the selections, wherein the processor is configured to direct the display to display a status of communication between the wireless PBX communication and the removable display unit. A telephone base unit may include an audio processor coupled to the processor, wherein the audio processor is configured to determine digital audio data in response to the audio data from the telephone handset, wherein the audio processor is configured to provide the digital audio data to the wireless communication unit, wherein the audio processor is configured to receive digital audio data from the wireless communication unit, wherein the audio processor is configured to equalize the digital audio data to determine equalized digital audio data in response to the digital audio data from the wireless communication unit, wherein the audio processor is configured to determine the output audio data to the user in response to the equalized digital audio data, and wherein the audio processor is configured to provide the output audio data to the full-sized telephone handset.

According to another aspect of the invention a telephone connection method performed by a desktop telephone device is described. A process may include detecting an off-hook condition in response to a user removing a telephone handset from the desktop telephone device, detecting a user selection of a function key associated with a PBX, and wirelessly instructing a portable PBX communication and display unit to initiate a telephone call to the PBX, wherein the portable PBX communication and display unit logs into the PBX via a plurality of signals, wherein the signals are selected from a group consisting of: IP packets, in-band DTMF tones. A method may include receiving a plurality of digital audio signals from the portable PBX communication and display unit, equalizing the plurality of digital audio signals to determine a plurality of audio signals, and driving a wide-band speaker of the telephone handset with the plurality of audio signals.

The invention will be better understood by reference to the following detailed description in connection with the accompanying drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
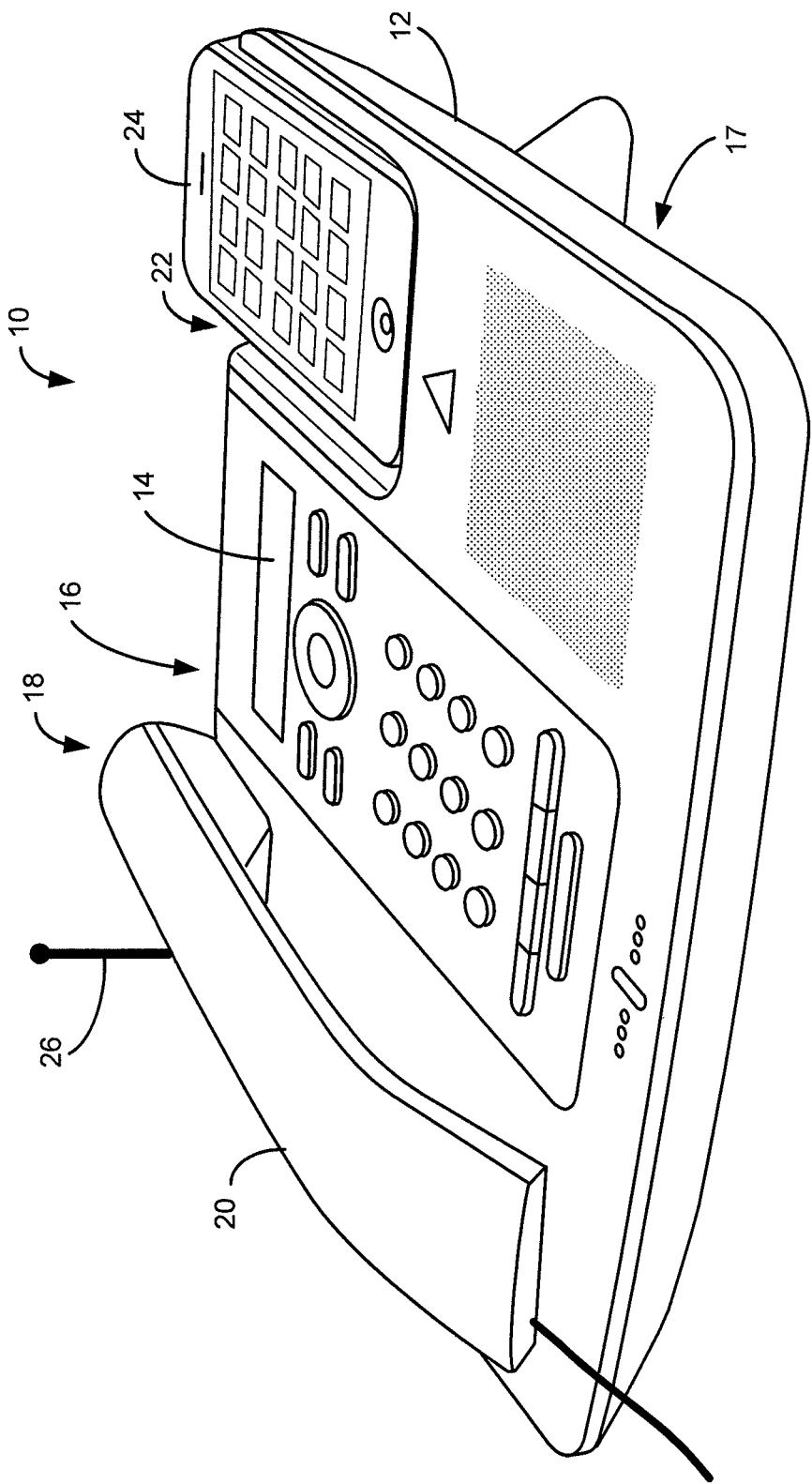
FIG. 1 is a perspective view of a first embodiment of the invention.

FIG. 1 is a perspective view of a representative embodiment of a console 10 incorporating functionality according to the invention. It has a base 12 with a display 14 and user interface 16, which could be a touchpad or keyboard, and a loudspeaker 17. There is a first cradle 18 for a conventional telephone handset 20 (e.g. a full-sized handset) and a second cradle 22 for a cellular telephone 24, both in the console 10. In some embodiments, an external antenna 26 is mounted on console 10. Not shown but also present are power connections for operating console 10 and/or charging cellular telephone 24 and physical data connections for high-speed transfer between the cellular phone 24 and the console 10, as well as a optional cable between the handset 20 and the console 10 and connection to a computer or external storage device. In various embodiments, cell phone charging is done by providing power to one of the USB pins. The power will be provided by a PC if the USB cable is connected between the console and the PC. Otherwise, the power is supplied by the power supply of the console.

Figure 2A:
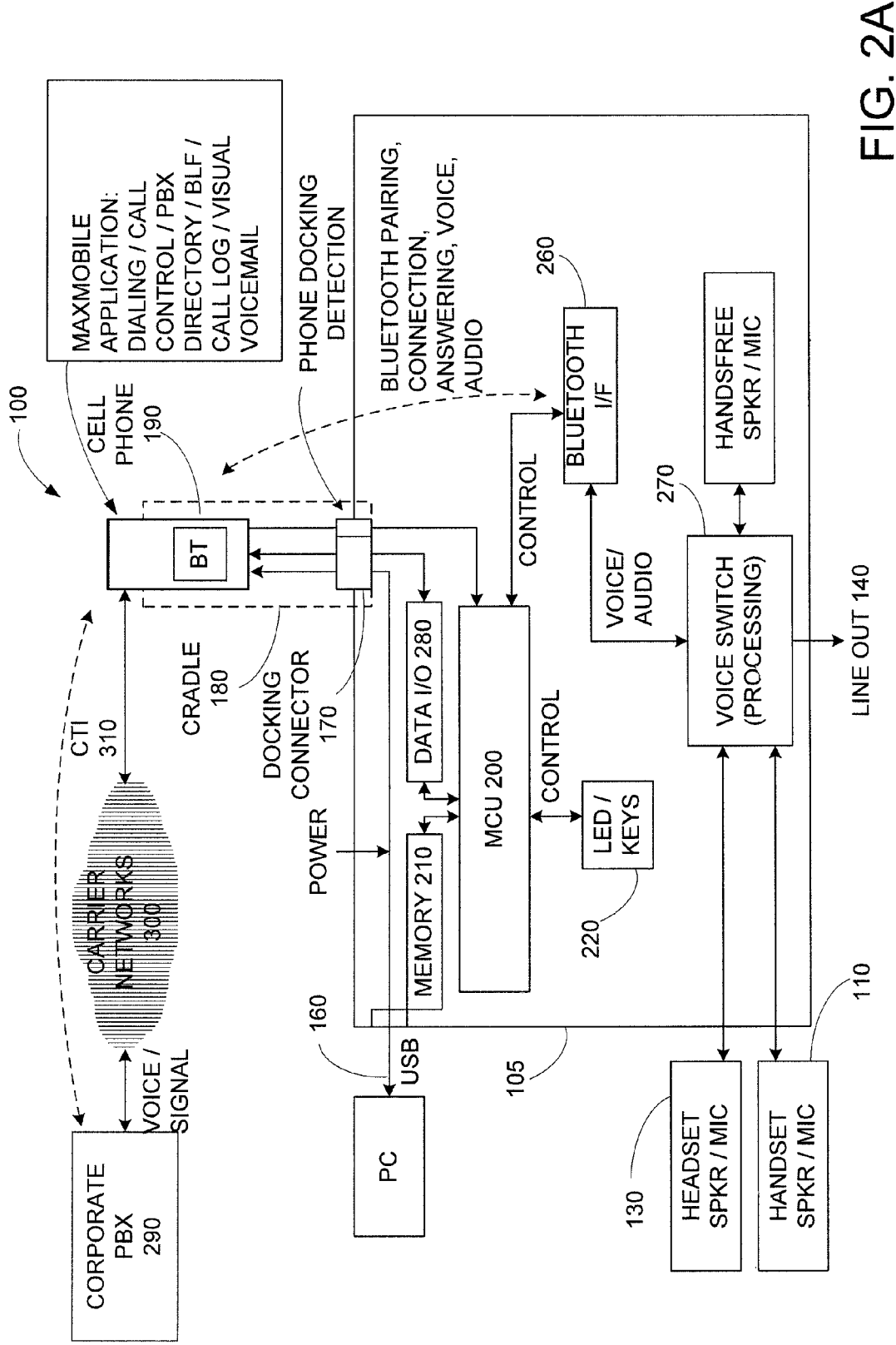
FIGS. 2A-B illustrate block diagrams according to embodiments of the present invention.

FIG. 2A illustrates a block diagram according to various embodiments of the present invention. As illustrated, a system 100 may include a telephone base unit 105, a full-sized telephone handset 110 coupled to telephone base unit 105 via a telephone cord, a speaker/microphone 120 for hands-free operation, headset capability 130, an audio output port 140, a serial port (e.g. USB) 160, one or more docking connectors 170, and a physical restraint 180 (e.g. cradle) for a portable cellular telephone 190. As illustrated, telephone base unit 105 may include a processing unit 200 with program memory 210. Processing unit 200 sends control signals and receives data from call control inputs 220 and a wireless interface 260. In various embodiments, wireless interface 260 is configured to pair with portable cellular telephone 190 via a similar interface, for example, via Bluetooth, Zigbee, IR, or the like. In FIG. 2A, a voice switch/processor 270 provides the D/A and A/D conversion of audible audio signals to digital signal data and performs processing upon the voice data.

In some embodiments of the present invention, data may be transferred between portable cellular telephone 190 and telephone base unit 105 via wireless interface 260. In other embodiments, an I/O data channel 280 may be provided between portable cellular telephone 190 and telephone base unit 105.

In various embodiments, portable cellular telephone 190 runs a software application that enables control of PBX functionality with PBX 290. In one instance, portable cellular telephone 190 is a iOS device (e.g. iPhone 3GS, iPhone 4 from Apple Corporation, Blackberry device from Research in Motion, or the like), and the software application is MaxMobile™ software from AltiGen Corporation of San Jose, Calif. As illustrated in FIG. 2A, portable cellular telephone 190 communicates voice and signal data via a wireless carrier network with corporate PBX 290. In operation this combination of hardware and software enables a computer/telephony integration (CTI) interface 310 between portable cellular telephone 190 and PBX 290. Further, in combination with embodiments of the present interface, this combination enables a CTI interface between telephone base unit 105 and PBX 290.

In various embodiments, in addition to a voice switching function, a voice switch/processor 270 also includes a various voice processing functions, such as an acoustic echo canceller, gain control, side tone, equalization, etc.

Figure 2B:
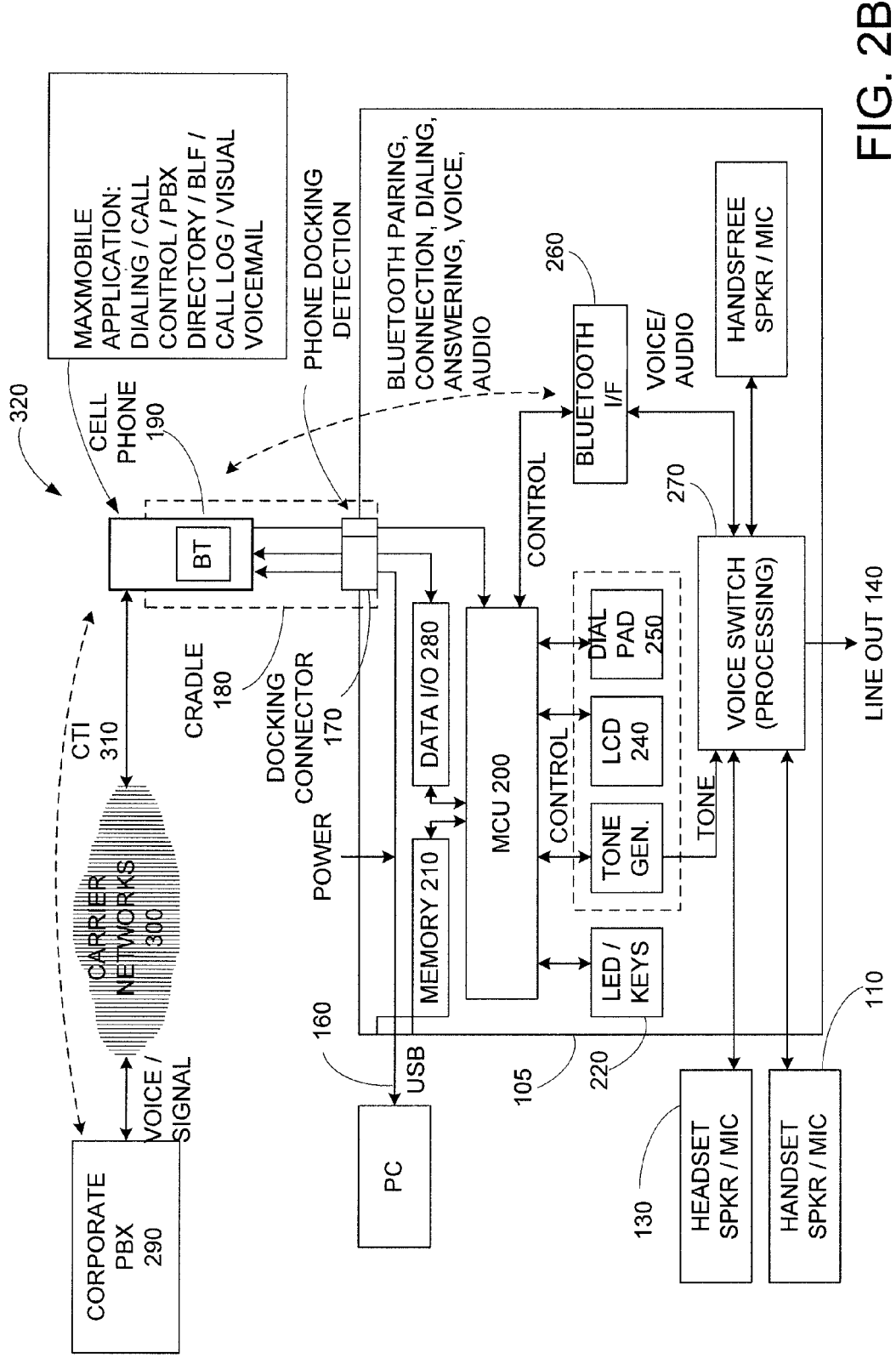
Figure 3:
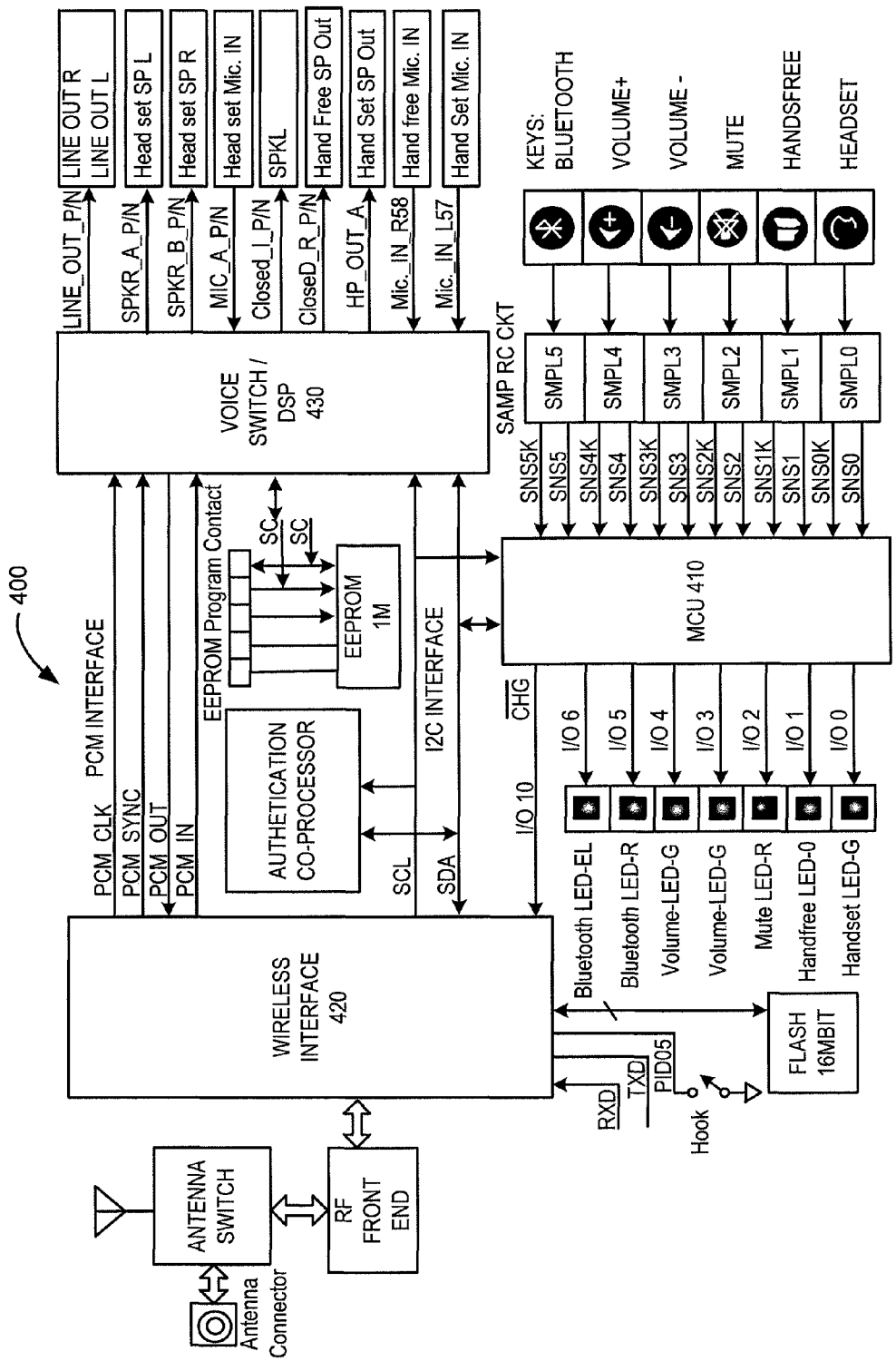
FIG. 3 is a block diagrams showing signal flows according to embodiments of the present invention.

In various embodiments, as illustrated in FIGS. 2A-B, a phone docking detector may be provided so that the console MCU can detect if the cell phone is docked or not and can act based on this status. As a result, the console can turn on/off the Bluetooth connection based on its status. Without diction, the console behaves the same regardless.

In various embodiments of the present invention, the embodiment illustrated in FIG. 2B includes a dial pad 250 and an LCD 240, and a tone generator 230. In various embodiments, dial pad 250 enables provides the user with conventional 12-key dial-pad functionality. Further, LCD 240 may provide the user with a variety of outputs, prompts, or the like, and may provide the user with status information, e.g. Bluetooth pairing status, or the like. In various embodiments, DTMF tones may be provided to the user via tone generator 230, the cell phone or by both the console and cell phone in various embodiments.

A described above, a software application running in the cell phone, herein labeled MaxMobile, and available from AltiGen, Corporation may interacts with a PBX through its CTI link to deliver PBX functionalities, such as dialing and call control, company directory, Busy Lamp Field, call history and visual voicemail capabilities to the user on the portable cellular telephone. A user may then use these device to access the speech path.

In various embodiments of the present invention, the multi-function base station allows the speech path to be redirected from a portable mobile device via a physical connector or a wireless media (Bluetooth) to the handset or speaker/microphone of the base station. A more detailed description of the components of various embodiments is given below.

In various embodiments, using only a Bluetooth connection, but not a physical connector for data transfer, when Bluetooth is engaging a switch on the cradle, a mechanical ON/OFF switch is provided as an option is to enable or disable the Console Bluetooth link. In various embodiments, when the mobile device is placed on the cradle, this mechanical switch is in ON position and the Console Bluetooth is activated. When no mobile device presents, the switch is in OFF position and Console Bluetooth functions is disabled. This avoids the confusion of which device, mobile device or Console, has the active voice path when the user takes a call.

In various embodiments, using an electronic connector, the audio port connector engaging mechanism is associated with an electro-mechanical device which when activated moves the audio connector to engage or disengage with the mobile device's audio port. The user can press a button to engage or disengage audio port connector.

In some embodiments, the phone docking detector is provided so that the console MCU can detect if the cell phone is docked or not and can act based on this status. The console can turn on/off the Bluetooth connection based on its status. Without diction, the console may still perform the following functions:

Cell phone charging is done by providing power to one of the USB pins. The power will be provided by a PC if the USB cable is connected between the console and the PC. Otherwise, the power is supplied by the power supply of the console. In various embodiments, with regards to a ring tone, since the embodiment in FIG. 2B includes a dial pad and LCD, the dial tone is provided by the console. Ring tone can be either provided by cell phone or by both the console and cell phone. Additionally, the user can make outgoing call by keying digits on the dial pad.

As described herein software running upon the portable cellular telephone, such as MaxMobile provides call control on the mobile device. In various embodiments, software enables the mobile device to interact with the PBX via data packets, and thus provides the user PBX functionality such as company directory, extension state monitoring, extension activity, visual voicemail, call log, call control, or the like. In various embodiments, when a call is connected between the PBX and the mobile device, the software (e.g. MaxMobile) can also interact with the PBX via in-band signal (such as DTMF tone). In operation: 1) a user press a control function on mobile device running the software application; 2) The software sends commands to the PBX via the carrier network; 3) PBX performs specified switching features to the call; and 4) the telephone base station allows the speech path for calls to be redirected from the mobile device via a physical connector or a wireless media (Bluetooth) to this handset.

Various embodiments of the present invention include the following process steps for logging in a portable cellular telephone in to a corporate PBX as a registered extension. In such embodiments, initially, the portable cellular telephone dials an access number associated with the PBX (e.g. corporate PBX). Subsequently, the portable cellular telephone number may provide log-in information to the PBX via a series of predetermined DTMF tones (e.g. a password) or via a series of data packets. In various embodiments, the log-in information may be provided via the MaxMobile software application (provided on the portable cellular telephone, e.g. iOS operating system phone). In other embodiments, the telephone base station may store identifying information, such that it directs the portable cellular telephone to dial the PBX, and then directs the portable cellular telephone to provide the appropriate PBX credentials (e.g. DTMF tones, data packets).

A summary of the process to connect to a PBX includes: 1) The device is paired with the mobile device; 2) The user may press Call via PBX key on the telephone base unit to connect to PBX; 3) After this key is pressed, the device instructs the mobile device to call the PBX via a wireless media (Bluetooth or other media); 4) Mobile device calls PBX; 5) After the call connection is established between mobile device and PBX, mobile device routes the speech path to the device.

In various embodiments, upon successful log-in into the PBX, the user can then specify the performance of PBX-specific functionality that is typically performed by physical extension units, such as Hold, Call, Transfer, Conference, feature code or voicemail functionality, etc. In operation, when a third party calls into the corporate PBX and requests the user's specific extension, the call is then routed to the telephone base station via the registered portable cellular telephone. A voice path is then established between the third party to the base telephone station, via the portable cellular telephone. In various embodiments, the user may select specific PBX operations either via a graphical user interface on the portable cellular telephone and/or one or more dedicated hardware/software keys on the telephone base station. Thus, as can be seen, the portable cellular telephone provides a PBX hardware and software interface to the stationary base station, and can be removed from the base station.

In embodiments where the called party is voicemail, Auto Attendant, IVR or some entity using DTMF digits for communications, the device may provide the DTMF functionality expected. A summary of the process includes: 1) Mobile device user can press a DTMF key on the device; 2) The device instructs mobile device to send DTMF signal to PBX via wireless media; 3) Mobile device instructs PBX to send DTMF tones to connected called party using data packets or in-band signal; 4) PBX sends the DTMF digits to called party via data packets or in-band signal In various embodiments, a user of the base telephone station may make outgoing calls as a PBX extension by connecting the portable cellular telephone to PBX and via a user interface, by instructing the PBX the destination number to call. More specifically, by using the embodiments of the present invention, e.g. MaxMobile software, or the like, the portable cellular telephone may connect to the PBX and the software may provide a series of identifying data, as described above (e.g. in-band voice path (DTMF) or data packets). Subsequently, when the portable cellular telephone has been logged-in, the user may enter a telephone number. In various embodiments, the number may be entered via the graphical user interface of the portable cellular telephone, or by using a physical keypad located on embodiments of the present invention. When a voice path is established between the portable cellular telephone to the base unit, the user may use the full-sized telephone handset to carry on the conversation, the speakerphone, or the like.

A summary of the call-out process is: 1) The device (e.g. base station) is paired with the mobile device (portable cellular telephone); 2) To make an outbound call as an extension user via PBX, user may press a key (Call via PBX key) on the base station then dial the destination number (the order can be reversed); 3) The base station instructs the mobile device to call the PBX via a wireless media (Bluetooth or other media); 4) The device instructs mobile device to send destination number to PBX; 5) Dialed digits of the destination number can be buffered at the device then sent to the mobile device. Or, dialed digits can be sent to mobile device after the digit key is pressed; 6) Mobile device sends the destination number to PBX either via data packets or via in-band voice path (e.g. DTMF tone); 7) After the call connection is established between mobile device and PBX, mobile device routes the speech path to the device; 8) PBX connects to the destination called party; 9) PBX connects the voice path of called party and mobile device; and 10) Mobile device user can hear and talk to the called party via the telephone base station. In various embodiments, a dial tone provided by the PBX may be provided to the user, prior to dialing.

A more detailed summary of the call out process includes: 1) When initiating a business call, a user may invoke the software application (e.g. MaxMobile) on the mobile device and select a contact or PBX extension entry from the software's Directory, Favorites, Call Log or Voicemail screen, or enter a number from a Dial pad screen on the mobile device; 2) The software invokes the API in the mobile device OS (e.g. iOS, Android) and the mobile device dials a Mobile Portal Number (associated with the PBX) first then followed by the digits of the specific destination number; 3) After the call to the PBX portal number is connected, the mobile phone dials the destination number; 4) After PBX receives destination number digits and dials the number, it connects the voice path between the destination and the desktop telephone (e.g. via the mobile device.

In other embodiments, the software invokes the API in the mobile device OS and dials the PBX Portal Number. The software also sends command over CTI link to instruct the PBX the destination number this mobile device wants to reach. This may be via IP data packets, or the like. PBX stores this destination in the memory. After the call between PBX and the mobile device phone is connected, PBX then makes an outbound call to the specified destination number and connects these two calls together. In still other embodiments, a user may press a Call via PBX button on the desktop telephone device (with keypad) then presses the DTMF keys on the desktop telephone device to make this outbound business call. After the dialed digits are collected, the device stores dialed digits in its local memory, and sends a command to the mobile device with the PBX Mobile Portal Number via wireless protocol (e.g. Bluetooth) to call this portal. The mobile device executes this command and initiates a call via cell network to connect to the Mobile PBX Portal Number. After the mobile device is coupled to the PBX, the mobile device sends a notification to desktop telephone to signal a call is connected. The desktop telephone device receives this notification and sends a command to the mobile device to send collected digits to PBX. The mobile device then sends these digits to cell network. After PBX receives destination number digits and dials the number, it connects the voice path between the destination and the desktop telephone device (via the mobile device).

In various embodiments, when initiating a personal call, a user may invoke the software on the mobile device and select a contact entry from software Directory, Favorites, Call Log or Voicemail screen. In response, the mobile device invokes the API in the mobile device OS and dials the destination number, i.e. without first dialing the Mobile PBX Portal Number. Alternatively, a user may press DTMF digit keys on the desktop telephone device (with keypad) to make this outbound call. After the dialed digits are collected, the desktop telephone device sends a command to the mobile device to dial the destination number, again without involving the PBX.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention has been explained with reference to various embodiments. Other embodiments will be evident to those of skill in the art. It is therefore not intended that the invention be limited, except as indicated by the appended claims.

What is claimed is:

1. A desktop telephone device comprising:
a full-sized telephone handset coupled to the telephone base unit, wherein the full-sized telephone handset comprising a microphone and a speaker, wherein the microphone is configured to receive audio data from the user and wherein the speaker comprises a wide-band speaker configured to output audio data to the user; and
a desktop telephone base unit comprising:
    a plurality buttons including numeric buttons and function buttons, wherein the plurality of buttons are configured to receive selections by a user;
    a display, wherein the display is configured to display status data to a user;
    a physical interface, wherein the physical interface is configured to removably restrain a portable PBX communication and display unit with respect to the telephone base unit;
    a wireless communication unit configured to wirelessly transmit control data and digital audio data to and from the portable PBX communication and display unit; and
    a processors coupled to the plurality of buttons, the display and to the wireless communication unit, wherein the processor is coupled to receive the selections by the user of buttons from the plurality of buttons, wherein the processor is configured to initiate communication between the wireless communication unit and the portable PBX communication and display unit in response to at least one of the selections, wherein the processor is configured to direct the display to display a status of communication between the wireless PBX communication and the portable PBX communication and display unit; and
    an audio processor coupled to the processor, wherein the audio processor is configured to determine digital audio data in response to the audio data from the telephone handset, wherein the audio processor is configured to provide the digital audio data to the wireless communication unit, wherein the audio processor is configured to receive digital audio data from the wireless communication unit, wherein the audio processor is configured to equalize the digital audio data to determine equalized digital audio data in response to the digital audio data from the wireless communication unit, wherein the audio processor is configured to determine the output audio data to the user in response to the equalized digital audio data, and wherein the audio processor is configured to provide the output audio data to the full-sized telephone handset;
wherein the full-sized telephone handset is coupled to the desktop telephone base unit via a telephone cord;
wherein the physical interface is configured to allow the portable PBX communication and display unit to be removably coupled to the telephone base unit, and
wherein the portable PBX communication and display unit is configured to transmit and receive data from a PBX server and to display PBX telephone calling status data to the user and to provide signaling to the PBX server in a manner selected from a group consisting of: in-band DTMF tones, IP packets.

2. The desktop telephone device of claim 1 wherein the physical interface further comprises:
an electronic interface, wherein the electronic interface is configured to provide and receive signals from the a portable PBX communication and display unit.

3. The desktop telephone device of claim 2
wherein the telephone base unit further comprises a USB interface coupled to the electronic interface;
wherein the USB interface is configured to be coupled to a USB port of a computer; and
wherein the USB interface is configured to receive data for storage from the computer on the portable PBX communication and display unit; and
wherein the electronic interface is configured to provide the data for storage to the portable PBX communication and display unit.

4. The desktop telephone device of claim 1 wherein the wireless communication unit is configured to wirelessly receive the digital audio data in the form of streaming audio data from the portable PBX communication and display unit via Bluetooth.

5. The desktop telephone device of claim 1 wherein the plurality of buttons are selected from a group consisting of: Bluetooth pairing, volume up, volume down, mute, hands free, headset.

6. The desktop telephone device of claim 1 wherein the telephone base unit further comprises a plurality of user-viewable status indicators, wherein the status indicators are selected from a group consisting of: Bluetooth paired, Bluetooth unpaired, mute, hands free mode, headset mode, hold.

7. The desktop telephone device of claim 1 wherein the display comprises an LCD display configured to display a plurality of status messages selected from a group consisting of: Bluetooth paired, Bluetooth unpaired, mute, hands free mode, headset mode, hold.

8. A desktop telephone device comprising:
a full-sized telephone handset coupled to the telephone base unit, wherein the full-sized telephone handset comprising a microphone and a speaker, wherein the microphone is configured to receive audio data from the user and wherein the speaker comprises a wide-band speaker configured to output audio data to the user; and
a telephone base unit comprising:
a plurality buttons including numeric buttons and function buttons, wherein the plurality of buttons are configured to receive selections by a user;
a display, wherein the display is configured to display status data to a user;
a physical interface, wherein the physical interface is configured to removably restrain a portable PBX communication and display unit with respect to the telephone base unit;
a wireless communication unit configured to wirelessly transmit control data and digital audio data to and from the portable PBX communication and display unit; and
a processor coupled to the plurality of buttons, the display and to the wireless communication unit, wherein the processor is coupled to receive the selections by the user of buttons from the plurality of buttons, wherein the processor is configured to initiate communication between the wireless communication unit and the portable PBX communication and display unit in response to at least one of the selections, wherein the processor is configured to direct the display to display a status of communication between the wireless PBX communication and the portable PBX communication and display unit; and
an audio processor coupled to the processor, wherein the audio processor is configured to determine digital audio data in response to the audio data from the telephone handset, wherein the audio processor is configured to provide the digital audio data to the wireless communication unit, wherein the audio processor is configured to receive digital audio data from the wireless communication unit, wherein the audio processor is configured to equalize the digital audio data to determine equalized digital audio data in response to the digital audio data from the wireless communication unit, wherein the audio processor is configured to determine the output audio data to the user in response to the equalized digital audio data, and wherein the audio processor is configured to provide the output audio data to the full-sized telephone handset;
wherein the portable PBX communication and display unit is removably coupled to the telephone base unit via the physical interface, wherein the portable PBX communication and display unit is configured to transmit and receive data from a PBX server and to display PBX telephone calling status data to the user and to provide signaling to the PBX server in a manner selected from a group consisting of: in-band DTMF tones, IP packets; and
wherein the portable PBX communication and display unit is configured to log into the PBX server without requiring a call-back from the PBX server.

9. A telephone connection method performed by a desktop telephone device comprising:
detecting an off-hook condition in response to a user removing a telephone handset from the desktop telephone device;
detecting a user selection of a function key associated with a PBX;
wirelessly instructing a portable PBX communication and display unit to initiate a telephone call to the PBX, the portable PBX communication and display unit removably coupled to a telephone base unit via a physical interface, wherein the portable PBX communication and display unit is configured to transmit and receive data from the PBX, wherein the portable PBX communication and display unit logs into the PBX via a plurality of signals, wherein the signals are selected from a group consisting of: IP packets, in-band DTMF tones to provide signaling to the PBX server in a manner selected from the group consisting of: in-band DTMF tones, IP packets;
receiving a plurality of digital audio signals from the portable PBX communication and display unit;
employing an audio processor to determine digital audio data in response to the audio data from the telephone handset, to provide the digital audio data wirelessly to the portable PBX communication and display unit, to receive digital audio data wirelessly from the portable PBX communication and display unit, to equalize the digital audio data to determine equalized digital audio data in response to the digital audio data from the portable PBX communication and display unit, to determine the output audio data to the user in response to the equalized digital audio data, and to provide the output audio data to the full-sized telephone handset;
causing the portable PBX communication and display unit to display PBX telephone calling status data to the user; and
driving a wide-band speaker of the telephone handset with the plurality of audio signals.

10. The method of claim 9 further comprising:
receiving a plurality of users selections of keypad keys on the desktop telephone device;
wirelessly providing the portable PBX communication and display unit with the plurality of user selections; and
driving the wide-band speaker of the telephone handset with a plurality DTMF tones determined in response to the plurality of user selections.

11. The method of claim 9
wherein the plurality of digital audio signals are associated with a plurality of available PBX functions;
wherein the method further comprising:

receiving a user selection of a keypad key on the desktop telephone device, wherein the keypad key is associated with one of the plurality of available PBX functions; and wirelessly providing the portable PBX communication and display unit with an indicator of the user selection.

12. The method of claim 11 wherein the indicator of the user selection is selected from a group consisting of: DTMF tone, IP packet.

13. The method of claim 9 further comprising:

wirelessly receiving an incoming call indicator from the portable PX communication and display unit;

detecting an off-hook condition in response to the user removing a telephone handset from the desktop telephone device;

receiving another plurality of digital audio signals from the portable PBX communication and display unit;

equalizing the other plurality of digital audio signals to determine another plurality of audio signals; and driving the wide-band speaker of the telephone handset with the other plurality of audio signals.

14. The method of claim 9 further comprising:

physically coupling the portable PBX communication and display unit to the desktop telephone device.

15. The method of claim 14 further comprising:

electrically coupling the portable PBX communication and display unit to the desktop telephone device; and providing the portable PBX communication and display unit from a computer system coupled to the desktop telephone device to the portable PBX communication and display unit.

16. The method of claim 15 wherein the physically coupling and the electrically coupling steps are performed in one physical motion.

17. The method of claim 9 further comprising:

wirelessly pairing the portable PBX communication and display unit to the desktop telephone device prior to the wireless instructing step.

* * * * *